(12) United States Patent
Choi et al.

(10) Patent No.: US 11,992,812 B2
(45) Date of Patent: May 28, 2024

(54) COMPOSITION FOR POLYAMIDE INTERFACIAL POLYMERIZATION, AND METHOD FOR MANUFACTURING WATER TREATMENT SEPARATION MEMBRANE BY USING SAME

(71) Applicant: LG CHEM, LTD., Seoul (KR)

(72) Inventors: Lakwon Choi, Daejeon (KR); Youngju Lee, Daejeon (KR); Eunkyoung Byun, Daejeon (KR); Chong Kyu Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 891 days.

(21) Appl. No.: 16/978,320

(22) PCT Filed: Jun. 14, 2019

(86) PCT No.: PCT/KR2019/007201
§ 371 (c)(1),
(2) Date: Sep. 4, 2020

(87) PCT Pub. No.: WO2019/240533
PCT Pub. Date: Dec. 19, 2019

(65) Prior Publication Data
US 2021/0001283 A1    Jan. 7, 2021

(30) Foreign Application Priority Data

Jun. 15, 2018  (KR) .................. 10-2018-0068926

(51) Int. Cl.
| | | |
|---|---|---|
| *B01D 69/12* | (2006.01) | |
| *B01D 69/10* | (2006.01) | |
| *B01D 71/56* | (2006.01) | |
| *C02F 1/44* | (2023.01) | |
| *C08G 69/04* | (2006.01) | |
| *C08K 5/17* | (2006.01) | |

(52) U.S. Cl.
CPC ..... *B01D 69/1251* (2022.08); *B01D 69/1071* (2022.08); *B01D 71/56* (2013.01); *C02F 1/44* (2013.01); *C08G 69/04* (2013.01); *C08K 5/17* (2013.01)

(58) Field of Classification Search
None
See application file for complete search history.

(56) References Cited

U.S. PATENT DOCUMENTS

| | | |
|---|---|---|
| 8,759,464 B2 | 6/2014 | Horgan et al. |
| 9,861,940 B2 | 1/2018 | Koehler et al. |
| 2007/0175820 A1 | 8/2007 | Koo et al. |
| 2007/0175821 A1 * | 8/2007 | Koo ............. B01D 71/56 210/490 |
| 2008/0234462 A1 | 9/2008 | Yoo et al. |
| 2012/0003387 A1 | 1/2012 | Kim et al. |
| 2013/0090444 A1 | 4/2013 | Horgan et al. |
| 2014/0205783 A1 | 7/2014 | Jeol et al. |
| 2015/0375179 A1 | 12/2015 | Kim et al. |

FOREIGN PATENT DOCUMENTS

| | | | |
|---|---|---|---|
| CN | 1954901 | 5/2007 | |
| CN | 101027113 | 8/2007 | |
| CN | 101244367 A | 8/2008 | |
| CN | 101745325 | 6/2010 | |
| CN | 103958460 A | 7/2014 | |
| CN | 104507556 A | 4/2015 | |
| CN | 107243262 A | 10/2017 | |
| DE | 69823029 | 9/2004 | |
| EP | 1958685 A1 | 8/2008 | |
| EP | 2140929 A1 | 1/2010 | |
| EP | 1958685 B1 | 3/2018 | |
| EP | 3 315 533 A1 | 5/2018 | |
| GB | 2390042 A * | 12/2003 | ......... B01D 67/0088 |
| GB | 2390042 B | 11/2006 | |
| JP | 2004-025102 | 1/2004 | |
| KR | 10-1999-0019008 | 3/1999 | |
| KR | 10-2005-0074167 | 7/2005 | |
| KR | 10-2008-0023117 | 3/2008 | |
| KR | 10-2008-0075765 | 8/2008 | |
| KR | 10-2010-0003799 | 1/2010 | |
| KR | 10-2010-0073795 | 7/2010 | |
| KR | 10-2014-0072182 | 6/2014 | |
| KR | 10-2015-0016019 | 2/2015 | |
| KR | 10-2017-0090816 | 8/2017 | |
| KR | 10-2018-0086037 | 7/2018 | |
| KR | 10-2019-0055664 | 5/2019 | |

OTHER PUBLICATIONS

Office Action of Taiwanese Patent Office in Appl'n No. 201980016102.3, dated Sep. 2, 2022.

* cited by examiner

*Primary Examiner* — Ryan B Huang
(74) *Attorney, Agent, or Firm* — Bryan Cave Leighton Paisner LLP

(57) ABSTRACT

Provided is a composition for interfacially polymerizing polyamide including an amine compound and a chain-type-structured additive containing one or more amino groups and two or more hydroxyl groups, and a method for manufacturing a water treatment separation membrane, and a water treatment separation membrane using the same.

6 Claims, 1 Drawing Sheet

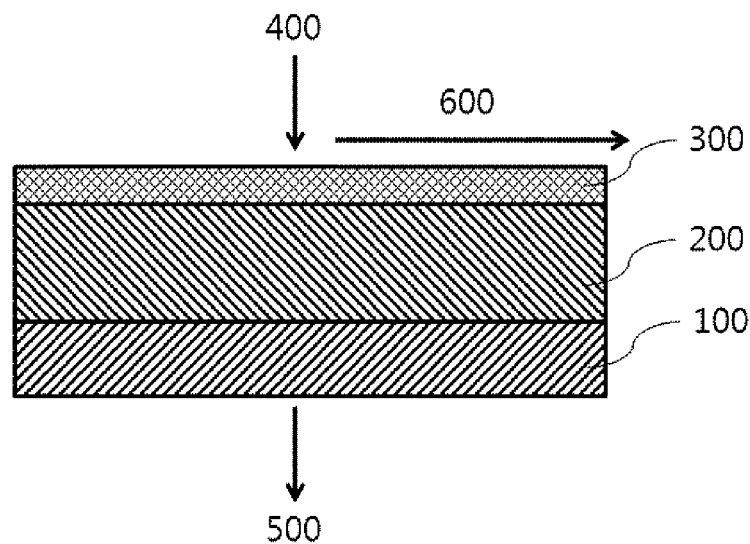

COMPOSITION FOR POLYAMIDE INTERFACIAL POLYMERIZATION, AND METHOD FOR MANUFACTURING WATER TREATMENT SEPARATION MEMBRANE BY USING SAME

CROSS-REFERENCE TO RELATED APPLICATIONS

This application is a National Stage Application of International Application No. PCT/KR2019/007201 filed on Jun. 14, 2019, which claims priority to and the benefits of Korean Patent Application No. 10-2018-0068926, filed with the Korean Intellectual Property Office on Jun. 15, 2018, the entire contents of which are incorporated herein by reference.

TECHNICAL FIELD

The present specification relates to a composition for interfacial polymerizing polyamide, and a method for manufacturing a water-treatment membrane using the same.

BACKGROUND

A phenomenon that a solvent moves from, between two solutions separated by a semi-permeable membrane, a solution with a low solute concentration to a solution with a high solute concentration through the membrane is referred to as an osmosis phenomenon, and herein, a pressure working on the side of the solution with a high solute concentration due to the solvent migration is referred to as an osmotic pressure. However, when applying an external pressure higher than an osmotic pressure, the solvent moves toward the solution with a low solute concentration, and this phenomenon is referred to as reverse osmosis. Using a reverse osmosis principle, various salts or organic substances can be separated through a semi-permeable membrane with a pressure gradient as a driving force.

A water-treatment membrane using such a reverse osmosis phenomenon has been used to supply water for household, construction and industry after separating substances at a molecular level and removing salts from salt water or sea water. Typical examples of such a water-treatment membrane can include a polyamide-based water-treatment membrane, and the polyamide-based water-treatment membrane is manufactured using a method of forming a polyamide active layer on a microporous support. More specifically, the polyamide-based water-treatment membrane is manufactured using a method of forming a polysulfone layer on a non-woven fabric to form a microporous support, dipping this microporous support into an aqueous m-phenylenediamine (hereinafter, mPD) solution to form an mPD layer, and dipping this again into an organic trimesoyl chloride (TMC) solvent, bringing the mPD layer into contact with the TMC, and interfacial polymerizing the result to form a polyamide layer.

In the water-treatment membrane, impurity rejection is used as an important indicator representing membrane performance.

BRIEF DESCRIPTION

Technical Problem

The present specification is directed to providing a composition for interfacial polymerizing polyamide, and a method for manufacturing a water-treatment membrane using the same.

Technical Solution

One embodiment of the present specification provides a composition for interfacial polymerizing polyamide including an amine compound; and
a chain-type-structured additive containing one or more amino groups and two or more hydroxyl groups each separately bonded to a carbon atom.

Another embodiment of the present specification provides a method for manufacturing a water-treatment membrane including preparing a porous support;
and forming a polyamide active layer on the porous support by interfacial polymerizing the composition for interfacial polymerizing polyamide and an acyl halide compound.

Another embodiment of the present specification provides a water-treatment membrane including a porous support; and
a polyamide active layer provided on the porous support and including a structure of the following Chemical Formula 3 or 4:

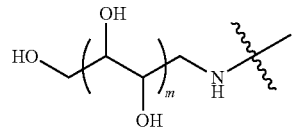

Chemical Formula 3

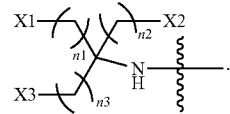

Chemical Formula 4

In Chemical Formulae 3 and 4:
m and n1 to n3 are an integer of 1 to 10;
X1 to X3 are each a hydroxyl group or an alkyl group, and at least two of X1 to X3 are a hydroxyl group; and

is a site bonding to a polyamide polymer of the polyamide active layer.

Another embodiment of the present specification provides a water-treatment module including one or more of the water-treatment membranes.

Advantageous Effects

Manufacturing a water-treatment membrane using a composition for interfacial polymerizing polyamide according to one embodiment of the present specification is effective in enhancing alcohol rejection and salt rejection since a polyamide active layer includes a number of hydroxyl groups.

DESCRIPTION OF DRAWINGS

FIG. 1 illustrates a water-treatment membrane according to one embodiment of the present specification.

REFERENCE NUMERALS

100: Non-Woven Fabric
200: Porous Support Layer
300: Polyamide Active Layer
400: Raw Water Including Impurities
500: Purified Water
600: Concentrated Water

DETAILED DESCRIPTION

Hereinafter, the present specification will be described in more detail.

One embodiment of the present specification provides a composition for interfacial polymerizing polyamide including an amine compound; and
  a chain-type-structured additive containing one or more amino groups and two or more hydroxyl groups each separately bonded to a carbon atom.

When preparing a polyamide active layer using the composition for interfacial polymerizing polyamide according to the present disclosure, the composition participates in polyamide formation by having reactivity with a monomer of an organic layer, and therefore, a number of hydroxyl groups are produced in the polyamide active layer. This leads to an increase in the hydrogen bonding energy with alcohols, which leads to not only enhancing alcohol rejection, but also obtaining an effect of increasing salt rejection since the hydroxyl groups are present in the empty space formed during the polyamide active layer forming process.

Specifically, the amino group (—NH$_2$) can have a chemical bond formed at the hydrogen position, and therefore, can participate in a reaction when forming the polyamide active layer and be present in a form included in the polyamide chain, and, compared to other functional groups, the hydroxyl group bonding to a carbon atom is highly effective in increasing alcohol rejection by forming a strong hydrogen bond with an alcohol.

In the present specification, the 'chain-type structure' means a structure that does not include a ring, and a chain-type compound can freely rotate compared to a structure including a ring and thereby has a wider radius of functional group movements. Accordingly, an effect of enhancing alcohol rejection is superior compared to a ring-type compound.

In addition, when using the composition for interfacial polymerizing polyamide according to the present disclosure in interfacial polymerization, the additive can be spread over all regions, and a greater effect can be obtained compared to a method of coating the additive on some regions.

In the present specification, a description of a certain member being placed "on" another member includes not only a case of the certain member adjoining the another member but a case of still another member being present between the two members.

In the present specification, a description of a certain part "including" certain constituents means capable of further including other constituents, and does not exclude other constituents unless particularly stated on the contrary.

In the present specification, the alkyl group can be linear or branched, and although not particularly limited thereto, the number of carbon atoms is preferably from 1 to 50. Specific examples thereof include methyl, ethyl, propyl, n-propyl, isopropyl, butyl, n-butyl, isobutyl, tert-butyl, sec-butyl, 1-methylbutyl, 1-ethylbutyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentyl-methyl, cyclohexyl-methyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylhexyl, 4-methylhexyl, 5-methylhexyl and the like, but are not limited thereto.

In one embodiment of the present specification, the additive is one of the following Chemical Formula 1 or 2:

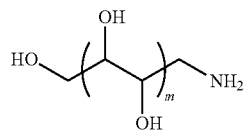

Chemical Formula 1

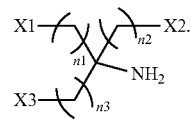

Chemical Formula 2

In Chemical Formulae 1 and 2:
m and n1 to n3 are an integer of 1 to 10; and
X1 to X3 are each a hydroxyl group; or an alkyl group, and at least two of X1 to X3 are a hydroxyl group.

In one embodiment of the present specification, m is an integer of 1 to 5.

In one embodiment of the present specification, m is 2.

In one embodiment of the present specification, n1 to n3 are each an integer of 1 to 5.

In one embodiment of the present specification, n1 to n3 are each 1.

In one embodiment of the present specification, X1 to X3 are each a hydroxyl group.

In one embodiment of the present specification, the additive is one or more types selected from among D-glucamine and tris(hydroxymethyl)aminomethane.

In one embodiment of the present specification, the amount of the additive is from 0.01 wt % to 1 wt %, preferably from 0.05 wt % to 0.5 wt %, and more preferably from 0.05 wt % to 0.15 wt % based on 100 wt % of the composition for interfacial polymerizing polyamide.

When the additive amount is less than 0.01 wt %, effects obtained by the additive are insignificant, and when the amount is greater than 1 wt %, the polyamide chain is formed short, which adversely affects active layer formation.

In one embodiment of the present specification, the amine compound is not limited as long as it can be used in polyamide polymerization, however, examples thereof can include m-phenylenediamine (mPD), p-phenylenediamine (PPD), 1,3,6-benzenetriamine (TAB), 4-chloro-1,3-phenylenediamine, 6-chloro-1,3-phenylenediamine, 3-chloro-1,4-phenylenediamine or mixtures thereof, and preferably, the amine compound can be m-phenylenediamine (mPD).

In one embodiment of the present specification, the amount of the amine compound can be from 0.001 wt % to 10 wt %, preferably from 1 wt % to 8 wt %, and more preferably from 3 wt % to 7 wt % based on 100 wt % of the composition for interfacial polymerizing polyamide.

When the amine compound amount is in the above-mentioned range, a uniform polyamide layer can be prepared.

In one embodiment of the present specification, the composition for interfacial polymerizing polyamide can further include a surfactant.

When interfacial polymerizing the polyamide active layer, polyamide is quickly famed at an interface of an aqueous solution layer and an organic solution layer, and herein, the surfactant makes the layer thin and uniform so that the amine compound present in the aqueous solution layer readily migrates to the organic solution layer to form a uniform polyamide active layer.

In one embodiment of the present specification, the surfactant can be selected from among nonionic, cationic, anionic and amphoteric surfactants. According to one embodiment of the present specification, the surfactant can be selected from among sodium lauryl sulphate (SLS); alkyl ether sulphates; alkyl sulphates; olefin sulfonates; alkyl ether carboxylates; sulfosuccinates; aromatic sulfonates; octylphenol ethoxylates; ethoxylated nonylphenols; alkyl poly(ethylene oxide); copolymers of poly(ethylene oxide) and poly(propylene oxide); alkyl polyglucosides such as octyl glucoside and decyl maltoside; aliphatic acid alcohols such as cetyl alcohol, oleyl alcohol, cocamide MEA, cocamide DEA, alkyl hydroxyethyldimethyl-ammonium chloride, cetyltrimethylammonium bromide, cetyltrimethylammonium chloride, hexadecyltrimethylammonium bromide and hexadecyltrimethylammonium chloride; and alkyl betaines. Specifically, the surfactant can be SLS, octylphenol ethoxylates or ethoxylated nonylphenols.

Particularly, when using sodium lauryl sulphate (SLS) as the surfactant, the SLS is highly soluble in water due to its high affinity for water and oil (hydrophile-lipophile balance, HLB), and by having a high critical micelle concentration (CMC), formation of the polyamide active layer is not inhibited even when added in excess.

In one embodiment of the present specification, the amount of the surfactant can be from 0.005 wt % to 0.5 wt % based on 100 wt % of the composition for interfacial polymerizing polyamide.

When the surfactant is included in the above-mentioned range, interfacial energy between the aqueous solution layer and the organic layer including an organic solution decreases increasing reactivity, and an effect of improving coating efficiency is obtained.

In one embodiment of the present specification, the composition for interfacial polymerizing polyamide can include water as a solvent, and the remainder excluding the amine compound, the additive and the surfactant in the composition, can all be water.

One embodiment of the present specification provides a method for manufacturing a water-treatment membrane including preparing a porous support; and foiling a polyamide active layer on the porous support by interfacial polymerizing the composition for interfacial polymerizing polyamide and an acyl halide compound.

In one embodiment of the present specification, the preparing of a porous support can be conducted by coating a polymer material on a non-woven fabric, and the type, thickness and porosity of the non-woven fabric can diversely vary as necessary.

Examples of the polymer material can include polysulfone, polyethersulfone, polycarbonate, polyethylene oxide, polyimide, polyetherimide, polyetheretherketone, polypropylene, polymethylpentene, polymethyl chloride, polyvinylidene fluoride and the like, but are not limited thereto.

In one embodiment of the present specification, the polymer material can be polysulfone.

In one embodiment of the present specification, the forming of a polyamide active layer can include forming an aqueous solution layer including the composition for interfacial polymerizing polyamide on the porous support; and bringing an organic solution including an acyl halide compound and an organic solvent into contact with the aqueous solution layer thereon.

When bringing the organic solution into contact with the aqueous solution layer including the composition for interfacial polymerizing polyamide, polyamide is produced by interfacial polymerization while the amine compound coated on the porous support surface and the acyl halide compound react, and the polyamide is adsorbed on the microporous support to form a thin film. As a method of the contact, a method of dipping, spraying, coating or the like can be used.

In one embodiment of the present specification, a method for forming the aqueous solution layer including the composition for interfacial polymerizing polyamide on the porous support is not particularly limited, and methods capable of forming an aqueous solution layer on a support can be used without limit. Specifically, spraying, coating, dipping, dropping or the like can be used.

In one embodiment of the present specification, the aqueous solution layer can further go through a step of removing an excess amine compound-including aqueous solution as necessary. The aqueous solution layer formed on the porous support can be non-uniformly distributed when there are too much of the aqueous solution present on the support, and when the aqueous solution is non-uniformly distributed, a non-uniform polyamide active layer may be formed by subsequent interfacial polymerization. Accordingly, the excess aqueous solution is preferably removed after foiling the aqueous solution layer on the support. A method of removing the excess aqueous solution is not particularly limited, however, methods using a sponge, an air knife, nitrogen gas blowing, natural drying, a compression roll or the like can be used.

The acyl halide compound is not limited as long as it can be used in polyamide polymerization, however, an aromatic compound having 2 or 3 carboxylic acid halides, for example, one compound type selected from the group consisting of trimesoyl chloride (TMC), isophthaloyl chloride, terephthaloyl chloride, and a mixture of two or more types thereof can be preferably used, and preferably, trimesoyl chloride (TMC) can be used.

In one embodiment of the present specification, the organic solvent preferably does not participate in an interfacial polymerization reaction, and an aliphatic hydrocarbon solvent, for example, one or more types selected from among freons, alkane having 5 to 12 carbon atoms and isoparaffin-based solvents, and an alkane mixture material, can be included. Specifically, one or more types selected from among hexane, heptane, octane, nonane, decane, undecane, dodecane, cyclohexane, IsoPar (Exxon), IsoPar G (Exxon), ISOL-C(SK Chem) and ISOL-G (Exxon) can be used, however, the organic solvent is not limited thereto.

The amount of the acyl halide compound can be from 0.05 wt % to 1 wt %, preferably from 0.08 wt % to 0.8 wt %, and more preferably from 0.05 wt % to 0.6 wt % based on 100 wt % of the organic solution.

A uniform polyamide layer can be prepared when the acyl halide compound amount is in the above-mentioned range.

One embodiment of the present specification provides a water-treatment membrane including a porous support; and a polyamide active layer provided on the porous support and including a structure of the following Chemical Formula 3 or 4:

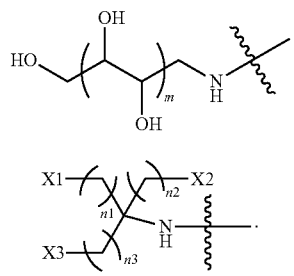

Chemical Formula 3

Chemical Formula 4

In Chemical Formulae 3 and 4:
m and n1 to n3 are an integer of 1 to 10;
X1 to X3 are each a hydroxyl group; or an alkyl group, and at least two of X1 to X3 are a hydroxyl group; and

is a site bonding to a polyamide polymer of the polyamide active layer.

In one embodiment of the present specification, Chemical Formulae 3 and 4 can bond to the polyamide polymer to form an —NHCO— type chemical bond.

In one embodiment of the present specification, the water-treatment membrane has an isopropyl alcohol (IPA) rejection of 90% or greater, preferably 92% or greater, and more preferably 94% or greater.

The IPA rejection is based on a value measured when applying an aqueous solution containing 100 ppm of isopropyl alcohol (IPA) flowing at a flow rate of 4 L/min on the water-treatment membrane surface with a pressure of 110 psi for 60 minutes or longer at 25° C.

For each constitution of the water-treatment membrane, descriptions on the composition for interfacial polymerizing polyamide and the method for manufacturing a water-treatment membrane described above can apply.

FIG. 1 illustrates the water-treatment membrane according to one embodiment of the present specification. Specifically, FIG. 1 illustrates the water-treatment membrane in which a non-woven fabric (100), a porous support layer (200) and a polyamide active layer (300) are consecutively provided, and as raw water including impurities (400) flows into the polyamide active layer (300), purified water (500) is discharged through the non-woven fabric (100), and concentrated water (600) is discharged outside failing to pass through the polyamide active layer (300). However, structures of the water-treatment membrane according to one embodiment of the present specification are not limited to the structure of FIG. 1, and additional constitutions can be further included.

In one embodiment of the present specification, the water-treatment membrane can be a microfiltration membrane, an ultrafiltration membrane, a nanofiltration membrane, or a reverse osmosis membrane, and can specifically be a reverse osmosis membrane.

One embodiment of the present disclosure provides a water-treatment module including one or more of the water-treatment membranes described above.

Specific types of the water-treatment module are not particularly limited, and examples thereof can include a plate & frame module, a tubular module, a hollow fiber module, a spiral wound module or the like. In addition, as long as the water-treatment module includes the reverse osmosis membrane according to one embodiment of the present specification described above, the water-treatment module is not particularly limited in other constitutions and manufacturing methods, and general means known in the art can be employed without limit.

Meanwhile, the water-treatment module according to one embodiment of the present specification has excellent salt rejection and boron rejection, and therefore, is useful in water-treatment systems such as household/industrial water-purification systems, sewage treatment systems or sea to fresh water treatment systems.

Hereinafter, the present specification will be described in detail with reference to examples in order to specifically describe the present specification. However, examples according to the present specification can be modified to various different forms, and the scope of the present specification is not construed as being limited to the examples described below. The examples of the present specification are provided in order to more fully describe the present specification to those having average knowledge in the art.

EXAMPLE: MANUFACTURE OF WATER-TREATMENT MEMBRANE

Comparative Example 1

18 wt % of a polysulfone solid was introduced to an N,N-dimethylformamide (DMF) solution and dissolved for 12 hours or longer at 80° C. to 85° C. to obtain a uniform liquid phase. This solution was cast to a thickness of 150 μm on a non-woven fabric made of a polyester material and having a thickness of 95 μm to 100 μm. Then, the cast non-woven fabric was placed in water to prepare a porous polysulfone support having porosity of 70%.

On the support, an aqueous solution layer was formed by coating a composition for interfacial polymerizing polyamide including, based on 100 wt % of the composition, 5 wt % of m-phenylenediamine (mPD), 0.06 wt % of sodium lauryl sulphate (SLS) as a surfactant, and the remainder of water.

Subsequently, an organic solution including 0.25 wt % of trimesoyl chloride (TMC) and 99.75 wt % of Isopar-G was coated on the aqueous solution layer to form an organic layer, and the result was interfacial polymerized to form a polyamide active layer, and as a result, a water-treatment membrane was manufactured.

Comparative Example 2

A water-treatment membrane was manufactured in the same manner as in Comparative Example 1 except that 0.08 wt % of 2,5-diaminobenzenesulfonic acid was added to the composition for interfacial polymerizing polyamide.

2,5-Diaminobenzenesulfonic Acid

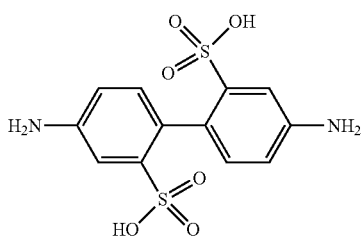 [SMILES: Nc1ccc(-c2ccc(N)cc2S(=O)(=O)O)c(S(=O)(=O)O)c1]

Comparative Example 3

A water-treatment membrane was manufactured in the same manner as in Comparative Example 2 except that the amount of 2,5-diaminobenzenesulfonic acid was changed to 0.24 wt %.

Comparative Example 4

A water-treatment membrane was manufactured in the same manner as in Comparative Example 1 except that 0.01 wt % of 4-aminoresorcinol hydrochloride was added to the composition for interfacial polymerizing polyamide.

4-Aminoresorcinol Hydrochloride

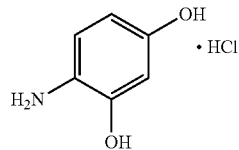

Comparative Example 5

A water-treatment membrane was manufactured in the same manner as in Comparative Example 4 except that the amount of 4-aminoresorcinol hydrochloride was changed to 0.1 wt %.

Example 1

A water-treatment membrane was manufactured in the same manner as in Comparative Example 1 except that 0.1 wt % of D-glucamine was added to the composition for interfacial polymerizing polyamide.

Example 2

A water-treatment membrane was manufactured in the same manner as in Comparative Example 1 except that 0.1 wt % of tris(hydroxymethyl)aminomethane was added to the composition for interfacial polymerizing polyamide.

Experimental Example: Performance Evaluation on Water-Treatment Membrane (1) Evaluation of Alcohol Rejection In order to measure IPA rejection and flux (GFD) of the water-treatment membranes manufactured according to the examples and the comparative examples, a water-treatment module formed including a flat-plate permeation cell, a high-pressure pump, a storage tank and a cooling device was used. The flat-plate permeation cell was a cross-flow type and had an effective permeation area of 28 cm$^2$. After installing the water-treatment membrane on the permeation cell, a sufficient preliminary operation was performed for approximately 1 hour using tertiary distilled water for device stabilization.

After that, device stabilization was confirmed by operating the device for approximately 1 hour with 100 ppm of IPA under the condition of 110 psi and a flow rate of 4 L/min, and then the amount of water permeated for 10 minutes at 25° C. was measured, and alcohol concentrations before and after the permeation were analyzed using a conductivity meter to calculate alcohol rejection. The results are as shown in the following Table 1.

(2) Evaluation of Salt Rejection

In order to measure salt rejection and flux (GFD) of the water-treatment membranes manufactured according to the examples and the comparative examples, a water-treatment module formed including a flat-plate permeation cell, a high-pressure pump, a storage tank and a cooling device was used. The flat-plate permeation cell was a cross-flow type and had an effective permeation area of 28 cm$^2$. After installing the water-treatment membrane on the permeation cell, a sufficient preliminary operation was performed for approximately 1 hour using tertiary distilled water for device stabilization.

After that, device stabilization was confirmed by operating the device for approximately 1 hour using 32,000 ppm of an aqueous NaCl solution under the condition of 150 psi and a flow rate of 4 L/min, and then flux (GFD, gallon/ft$^2$/day) was calculated by measuring the amount of water permeated for 10 minutes at 25° C., and salt concentrations before and after the permeation were analyzed using a conductivity meter to calculate salt rejection. The results are as shown in the following Table 1.

TABLE 1

| | Additive Type | Additive Content (wt %) | Salt Rejection (%) | Flux (GFD) | IPA Rejection (%) |
|---|---|---|---|---|---|
| Comparative Example 1 | — | 0 | 99.56 | 16.14 | 92.5 |
| Comparative Example 2 | 2,5-Diaminobenzene-sulfonic acid | 0.08 | 99.51 | 20.22 | 91.9 |
| Comparative Example 3 | 2,5-Diaminobenzene-sulfonic acid | 0.24 | 99.45 | 22.37 | 90.7 |
| Comparative Example 4 | 4-Aminoresorcinol hydrochloride | 0.01 | 99.41 | 16.24 | 91.1 |
| Comparative Example 5 | 4-Aminoresorcinol hydrochloride | 0.1 | 99.45 | 15.89 | 90.8 |
| Example 1 | D-Glucamine | 0.1 | 99.77 | 14.62 | 94.7 |
| Example 2 | Tris(hydroxymethyl)amino-methane | 0.1 | 99.60 | 15.48 | 94.2 |

From the results shown in Table 1, it was identified that Examples 1 and 2 including the additive according to the present disclosure had enhanced salt rejection and IPA rejection compared to Comparative Examples 1 to 3 due to the presence of a hydroxyl group produced when forming the polyamide active layer.

Specifically, whereas Comparative Examples 2 and 3 using an additive in which a hydroxyl group is bonded to sulfur instead of to a carbon atom, and Comparative Examples 4 and 5 using an additive having a structure including a ring instead of a chain-type structure, had salt rejection and IPA rejection decreased compared to even Comparative Example 1 that did not include an additive, Examples 1 and 2 using a chain-type-structured additive including a hydroxyl group bonded to a carbon atom had both increased salt rejection and IPA rejection compared to Comparative Example 1 that did not include an additive.

In other words, it was proved that manufacturing a water-treatment membrane using the composition for interfacial polymerizing polyamide according to one embodiment of the present specification is effective in enhancing both salt rejection and IPA rejection.

The invention claimed is:

1. An aqueous solution composition for interfacially polymerizing polyamide, comprising:
   an amine compound in an amount from 0.001 wt % to 10 wt % based on 100 wt % of the composition;
   a chain-type-structured additive containing one or more amino groups and two or more hydroxyl groups each separately bonded to a carbon atom in an amount from 0.01 wt % to 1 wt % based on 100 wt % of the composition;
   a surfactant in an amount from 0.005 wt % to 0.5 wt % based on 100 wt % of the composition; and
   water.

2. The composition of claim 1, wherein the chain-type-structured additive is one of the following Chemical Formula 1 or 2:

Chemical Formula 1

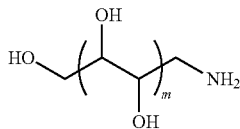

Chemical Formula 2

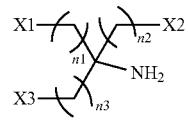

wherein:
   m and n1 to n3 are each an integer selected from 1 to 10; and
   X1 to X3 are each independently a hydroxyl group or an alkyl group, and at least two of X1 to X3 are a hydroxyl group.

3. The composition of claim 2, wherein X1 to X3 are each a hydroxyl group.

4. The composition of claim 1, wherein the chain-type-structured additive is one or more types selected from among D-glucamine and tris(hydroxymethyl)aminomethane.

5. The composition of claim 1, wherein the surfactant comprises one or more chemicals selected from among sodium lauryl sulphate (SLS), an alkyl ether sulphate, an alkyl sulphate, an olefin sulfonate, an alkyl ether carboxylate, a sulfosuccinate, an aromatic sulfonate, an octylphenol ethoxylate, an ethoxylated nonylphenol, an alkyl poly(ethylene oxide), a copolymer of poly(ethylene oxide) and poly(propylene oxide), an alkyl polyglucoside, cetyl alcohol, oleyl alcohol, cocamide MEA, cocamide DEA, alkyl hydroxyethyldimethyl-ammonium chloride, cetyltrimethyl-ammonium bromide, cetyltrimethylammonium chloride, hexadecyltrimethylammonium bromide, hexadecyltrimethylammonium chloride, and an alkyl betaine.

6. A method for manufacturing a water-treatment membrane, the method comprising:
   preparing a porous support; and
   forming a polyamide active layer on the porous support by interfacially polymerizing the composition of claim 1 and an acyl halide compound.

* * * * *